United States Patent
Sipe et al.

(10) Patent No.: US 9,542,976 B2
(45) Date of Patent: Jan. 10, 2017

(54) SYNCHRONIZING VIDEOS WITH FRAME-BASED METADATA USING VIDEO CONTENT

(71) Applicant: Google Inc., Mountain View, CA (US)

(72) Inventors: Michael Andrew Sipe, Pittsburgh, PA (US); Michael Christian Nechyba, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 393 days.

(21) Appl. No.: 14/025,907

(22) Filed: Sep. 13, 2013

(65) Prior Publication Data

US 2015/0078729 A1    Mar. 19, 2015

(51) Int. Cl.
| | |
|---|---|
| H04N 5/445 | (2011.01) |
| G11B 27/10 | (2006.01) |
| H04N 21/235 | (2011.01) |
| H04N 21/2343 | (2011.01) |
| H04N 19/40 | (2014.01) |
| H04N 21/4402 | (2011.01) |
| H04N 21/00 | (2011.01) |
| G11B 27/11 | (2006.01) |
| H04N 21/234 | (2011.01) |
| H04N 21/242 | (2011.01) |

(52) U.S. Cl.
CPC ............ *G11B 27/10* (2013.01); *G11B 27/11* (2013.01); *H04N 7/26941* (2013.01); *H04N 21/00* (2013.01); *H04N 21/2343* (2013.01); *H04N 21/2355* (2013.01); *H04N 21/23418* (2013.01); *H04N 21/234309* (2013.01); *H04N 21/234345* (2013.01); *H04N 21/440245* (2013.01); *H04N 21/242* (2013.01)

(58) Field of Classification Search
CPC ............ H04N 21/2343; H04N 7/26941; H04N 21/234309; H04N 21/234345; H04N 21/2355; H04N 21/440245
USPC .................................................. 725/40, 47
See application file for complete search history.

(56) References Cited

U.S. PATENT DOCUMENTS

| | | | |
|---|---|---|---|
| 8,180,396 B2 * | 5/2012 | Athsani ................... G06F 3/011 | |
| | | | 455/418 |
| 8,259,806 B2 | 9/2012 | Radhakrishnan et al. | |
| 8,335,786 B2 | 12/2012 | Pereira et al. | |
| 8,358,837 B2 | 1/2013 | Shakya et al. | |
| 8,433,143 B1 | 4/2013 | Carson et al. | |
| 2009/0210395 A1 * | 8/2009 | Sedam ............................. 707/3 |
| 2012/0269364 A1 | 10/2012 | Salvucci | |
| 2013/0262989 A1 * | 10/2013 | Jain et al. ...................... 715/243 |
| 2013/0294642 A1 * | 11/2013 | Wang et al. .................. 382/103 |

* cited by examiner

*Primary Examiner* — Pankaj Kumar
*Assistant Examiner* — Franklin Andramuno
(74) *Attorney, Agent, or Firm* — Morris & Kamlay LLP

(57) ABSTRACT

A transformed video and a source video may be synchronized according to implementations disclosed herein to provide tag information to the device receiving the transformed version of the video. A synchronization signal may be computed on the source video and the transformed video using a statistic such as mean pixel intensity. The synchronization signals computed for the transformed video and source video may be compared to determine a transformed video reference point location for the requested tag information. The requested tag information may be provided to the device receiving the transformed version of the video.

28 Claims, 6 Drawing Sheets

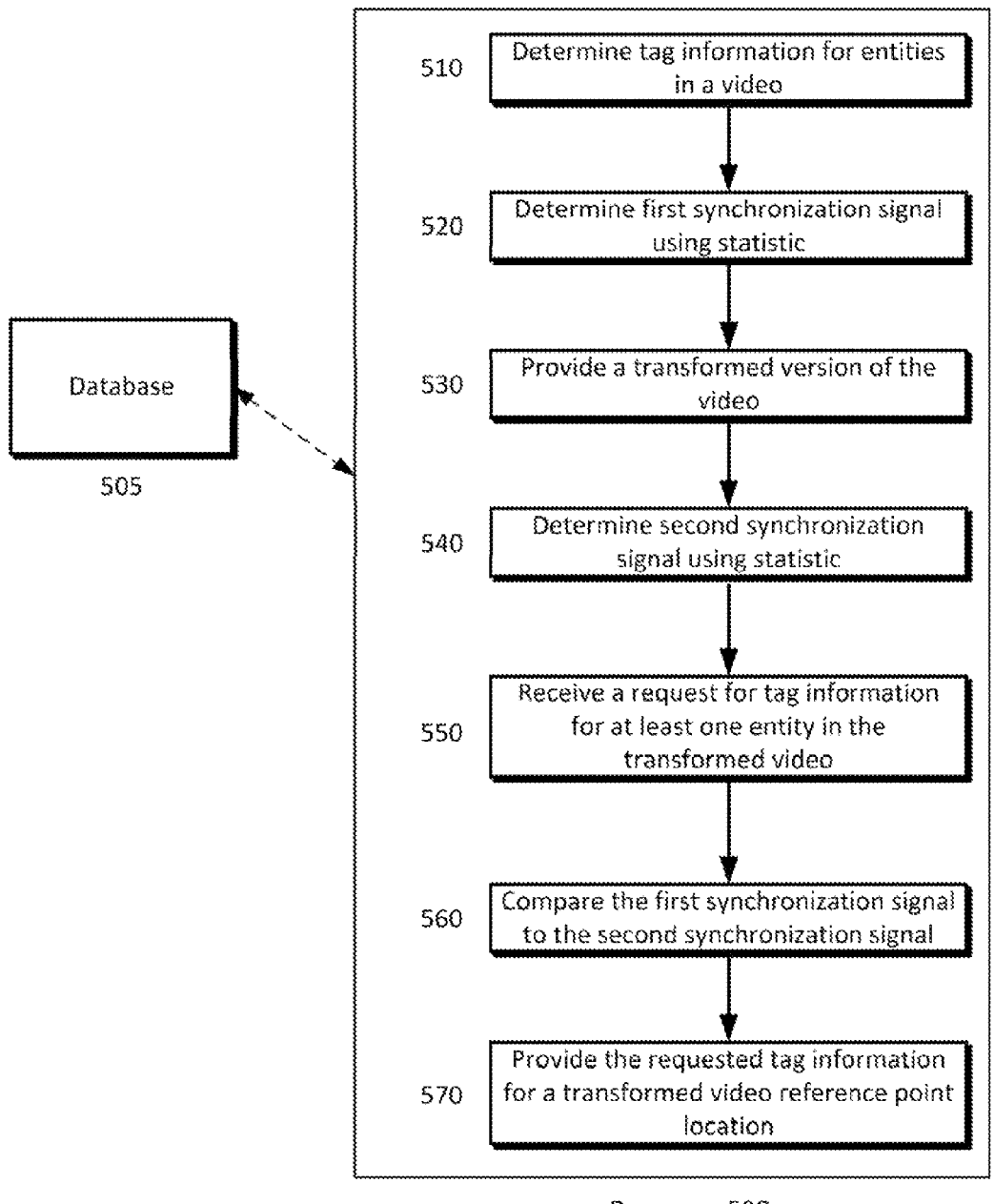

SYNCHRONIZING VIDEOS WITH FRAME-BASED METADATA USING VIDEO CONTENT

BACKGROUND

Information may be collected about entities in a movie at a particular time reference. For example, a user may pause a video and query which actor is present in the paused frame by clicking on a particular actor's face. Other information about the actor or other entities in the scene may be available. To link information about the objects on the screen, a video may be subject to a tagging phase such that entities in a scene are identified and recognized. The tagged entities may be stored. Each tag may include the identity of the entity and a time reference (or video frame) in which the entity appears. In some cases, the position, such as coordinates, of the entity (e.g., where a person's face is located) in the frame may be stored as well.

Tags may be synchronized to the video during playback using the elapsed playing time or current frame number. For example, if information about objects at a time, t, may be requested, then tag data at time t may be searched. But elapsed playing time and frame number are not reliable indicators for synchronization if the video playing is a transformed version of the video that was tagged. Transformations that commonly occur include, for example, changing encoding formats or editing. In both examples, frames may be added or removed. Transformations may occur where a user desires content in a different format than the one on which the tagging was performed or where bandwidth is limiting, for example.

BRIEF SUMMARY

According to an implementation of the disclosed subject matter, tag information for one or more entities in a video may be determined. The tag information may include an identity of the one or more entities and a video entity reference location for each of the one or more entities. A first synchronization signal may be determined for the video using a statistic. A transformed version of the video may be provided. A second synchronization signal may be determined for the transformed version of the video using the statistic. A request for tag information may be received for at least one of the one or more entities in the transformed version of the video. The first synchronization signal may be compared to the second synchronization signal to determine a transformed video reference point location for the requested tag information. The requested tag information may be provided at the transformed video reference point location based on the comparison of the first synchronization signal to the second synchronization signal.

In an implementation, a database is provided that may store tag information for one or more entities in a video. The tag information may include an identity of each of the one or more entities and a video entity reference location for each of the one or more entities. A processor may be communicatively coupled to the database. It may be configured to determine tag information for the one or more entities in the video. It may determine a first synchronization signal for the video using a statistic. The processor may provide a transformed version of the video. It may determine a second synchronization signal for the transformed version of the video using the statistic. It may receive a request for tag information for at least one of the entities in the transformed version of the video. It may compare the first synchronization signal to the second synchronization signal to determine a transformed video reference point location for the requested tag information. The processor may provide the requested tag information at the transformed video reference point location based on the comparison of the first synchronization signal to the second synchronization signal.

In an implementation, tag information may be determined for one or more entities in a video. The tag information may include an identity of each of the entities and a video entity reference location for each of the entities. A first synchronization signal for the video may be determined using a statistic. A transformed version of the video may be provided. A second synchronization signal may be received for the transformed version of the video using the statistic. A request for tag information may be received for at least one of the entities in the transformed version of the video. The first synchronization signal may be compared to the second synchronization signal to determine a transformed video reference point location for the requested tag information. The requested tag information may be provided at the transformed video reference point location based on the comparison of the first synchronization signal to the second synchronization signal.

In an implementation, a system is provided that includes a database for storing tag information for one or more entities in a video. The tag information may include an identity of each of the entities and a video entity reference location for each of the entities. A processor may be communicatively coupled to the database and configured to determine tag information for the entities in the video. It may determine a first synchronization signal for the video using a statistic and provide a transformed version of the video. The processor may receive a second synchronization signal for the transformed version of the video using the statistic. It may receive a request for tag information for at least one entity in the transformed version of the video. The processor may compare the first synchronization signal to the second synchronization signal to determine a transformed video reference point location for the requested tag information. The processor may provide the requested tag information at the transformed video reference point location based on the comparison of the first synchronization signal to the second synchronization signal.

According to an implementation, a first synchronization signal may be received for a video that is based on a statistic. A transformed version of the video may be received. A second synchronization signal for the transformed version of the video may be determined using the statistic. The first synchronization signal may be compared to the second synchronization signal to determine a transformed video reference point location. Tag information may be requested for at least one of the entities in the transformed version of the video based on the determined transformed video reference point location. The tag information may include an identity of each of the entities in the transformed video reference point location. Tag information may be received for the entities for the transformed video reference point location.

A system is disclosed in an implementation that includes a database for storing synchronization signal data and a processor communicatively coupled to the database. The processor may be configured to receive a first synchronization signal for a video that is based on a statistic. It may receive a transformed version of the video. The processor may determine a second synchronization signal for the transformed version of the video using the statistic. It may compare the first synchronization signal to the second synchronization signal to determine a transformed video reference point location. The processor may request tag information for at least one entity in the transformed version of the video based on the transformed video reference point location. The tag information may include an identity of each of the entities for the transformed video reference point location. The processor may receive tag information for the entities for the transformed video reference point location.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 5 is an example system for synchronizing a source video containing tag information with a transformed version of the video.

DETAILED DESCRIPTION

In an implementation, a method is provided that may avoid synchronization errors by embedding a synchronization signal with the tag data. An example signal may be frame mean intensity value. Other signals may be determined as well and utilized as a composite synchronization signal. In an implementation, during the tagging phase described above, a statistic may be computed based on at least one synchronization signal for each frame of a video. The computed statistic may be stored for each frame in a table. The time position of an entity's appearance with the frame number may be tagged and likewise stored. During the playback a statistic may be computed for a signal on each playback video frame as playback proceeds. Upon receiving a query from a user (e.g., a user querying what actor is present in a specific scene/video frame), the cross-correlation between the statistics based on synchronization signals of the tagged and playback videos may be determined. The peak in the cross correlation between the synchronization signal statistics may correspond to the frame number match between the two videos.

For example, mean intensity may be computed for each frame of a video during the tagging phase and associated with a time reference. The tagging information, intensity data, and the time reference may be stored to a database table. A user may initiate playback of the video on a mobile device that requires the original video be transcoded to a compressed, lower frame-rate video. The mean intensity of each frame (an example of a statistic) may be computed on the transcoded video during playback. The user may initiate a query (e.g., pause movie and click on an actor's face). Essentially, the pattern of mean intensity on the transcoded video up to that point may be compared to the pattern of mean intensity on the original video. The most closely aligned patterns between the two videos represents the most likely location in the transcoded video. Adding additional synchronization signals enhances the robustness of a match between the transcoded video and the original, tagged video. Other variations may include varying the amount of frames included in computing the statistic or preselecting a portion of the video to match against the transcoded video.

Figure 1:
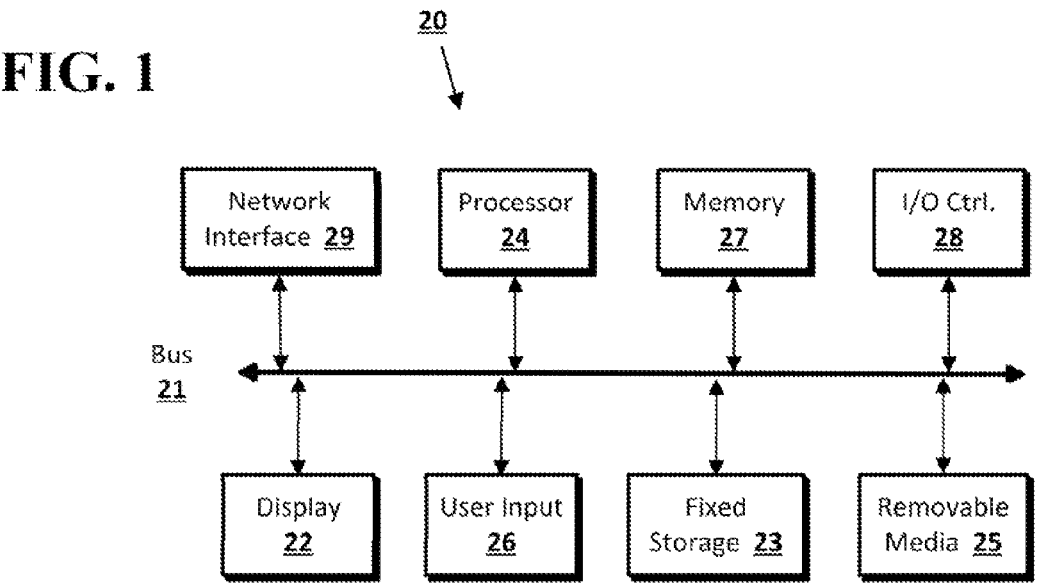
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
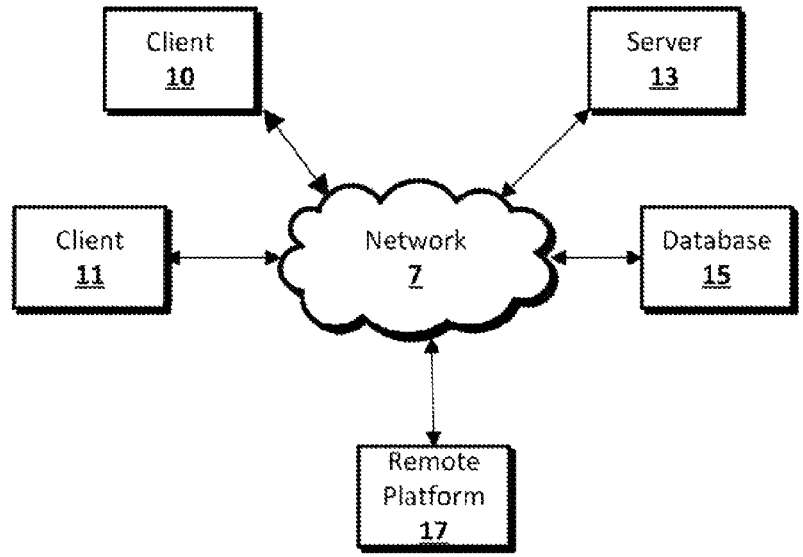
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
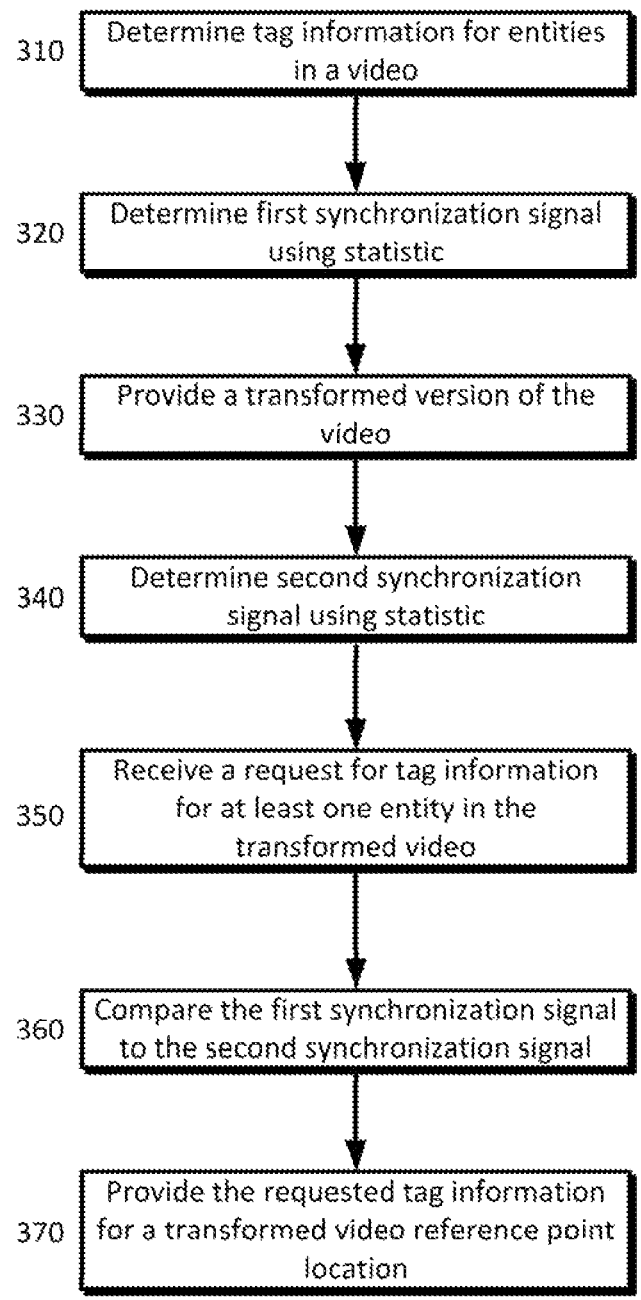
FIG. 3 is an example method for synchronizing a transformed video with a video that has tag information.

In an implementation, an example of which is provided in FIG. 3, tag information may be determined for one or more entities in a video at 310. An entity may be an audio component of the movie, a visual component of the movie, or a combination thereof. Examples of an audio component may include, without limitation: a song, a soundtrack, a voice or speech, and a sound effect. A sound effect may refer to a dog barking, a car screech, an explosion, etc. A visual component may include, for example: a scene break, a geographic location, a face, a person, an object, a physical object, a text, or a landmark. A geographic location may refer to a particular place such as Paris, an address, a landmark such as the Grand Canyon, etc. A face may be determined from a gallery in which a person has been tagged, identified, or otherwise labeled. For example, a home video application may identify faces of individuals in a video. In some instances, an individual may be identified in an online photo or other type of online publication or news article. Such sources may also be utilized to automatically identify a visual component. An example of an object that may be automatically identified is a car. The car may be identified by its make, model, manufacturer, year, etc. Faces, objects, and other entities may be identified by comparison to related galleries or other stored images that include those entities, such as where a face in a home video is identified based upon a gallery maintained by a user that includes images of a person present in the home video. Similarly, a car may be identified by comparison to a database of images of known makes and models of automobiles. A movie may contain text, for example, a subtitle, a closed caption, or on a sign in the movie. Optical character recognition may be employed to identify the text that is available in a particular scene or frame of the movie.

Automatic identification of an entity in the movie may be performed using, for example, facial recognition, speech or voice recognition, text recognition or optical character recognition, or pattern recognition such as for a song. Automatic identification of one or more entities may proceed in real time as frames of a movie are received, played, or streamed. In some configurations, the identification may be limited to a particular entity such as an actor. In some configurations, a database may be used to store features associated with various objects, persons, faces, geographic locations, etc. to which a movie that is obtained may be compared to identify one or more entities. Multiple entities may be determined simultaneously in a movie. An entity may be determined on a frame-by-frame basis or based on a chapter/scene break. Information regarding an automatically identified entity may be stored in a database and be linked to a time reference or other references to the movie.

Tag information may include an identity of each of the one or more entities and a video entity reference location for each of the one or more entities. A video entity reference location may be, for example, a time reference or a video frame reference. For example, in a particular scene of a movie, a car from Manufacturer X may be identified as the make of the car. A database entry containing the tag information (e.g., Manufacturer X) may be generated. The tag information may include a position of the entity in a frame or video. For example, the database entry may include a time reference, a video frame reference, and/or coordinates of the car in Euclidean space of the video frame. The database containing the stored entity may receive queries regarding an automatically identified entity. For example, a song may be identified as being present from one time reference to another or in a particular chapter or scene of a movie. Thus, automatic identification of an entity may include, without limitation, automatically recognizing: faces, objects (e.g., cars, airplanes, bikes, etc.), geographic locations, logos, gender, age, characteristics of an individual (e.g., whether a person is smiling or frowning), animals, speech, printed text, scene breaks in a movie, object tracking, speech recognition, or a song/music (e.g., audio recognition). Object tracking may refer to detecting an object over two or more time reference points. For example, a soda can may be detected in a first scene and the same soda can may be detected throughout the first scene and/or when the soda can again appears in a second scene, which may or may not chronologically follow the first scene. Determining tag information for one or more entities may refer to the process of obtaining tag information from a database (e.g., querying a database with a reference time) and/or generating tag from a video.

A first synchronization signal may be determined for the video using a statistic at 320. The statistic may be a mean pixel intensity, a color intensity, a color tone, a number of pixels of a particular intensity or color, etc. of a video. The statistic may be computed on a portion of a video frame. For example, if a video frame measures 1080 pixels (horizontal axis) by 1920 pixels (vertical axis), a statistic may be applied to or measure pixels at coordinates 1-100 on the horizontal axis and 1000-1200 on the vertical axis. Other examples of a statistic may be measured by a column or row of pixels. As another example, a statistic may be the centroid of the highest pixel intensity for a frame. A window may be slid over a frame incrementally and the pixel intensity for each region may be measured (e.g., the window may be a 6×6 pixel square window). A centroid may be determined based on the highest pixel intensity region according based on the sliding window. The first synchronization signal may be determined on a portion of the video. For example, if a video is a movie that is an hour and half in length, the synchronization may be determined on or retrieved for a portion of the video. The portion of the video on which or for which the first synchronization is determined or retrieved may be based on the request for tag information as described below, at 350. For example, if the request for tag information corresponds to a time reference that is an hour into the video, threshold limits may be established that determines or retrieves the first synchronization signal data for a portion of the video corresponding to +/− five minutes or +/− five hundred video frames from the tag request location in the transformed version of the video. The threshold limits may be configurable. Similarly, the second synchronization signal may be computed on a portion of the transformed video. The portion of the transformed version on which the second synchronization signal is determined may be configurable.

The synchronization signal (e.g., the first synchronization signal and/or second synchronization signal) may be the numerical representation of the statistic in any implementation disclosed herein. For example, a statistic may be the mean pixel intensity while the first synchronization signal may be a number representing the computation of the mean pixel intensity on one or more frames in a source video.

A transformed version of the video may be provided at 330. For example, a video may be stored in a database and have a resolution of 1080×1920. A request to play the video may be received from a mobile device that only has a cellular radio or network with a bandwidth that can only support a maximum image resolution of 640×480 or the smartphone may only have a screen capable of displaying a resolution of 640×480. Rather than stream a high definition video to a device that is incapable of using it, a transformed version of the video may be sent. In this example, the original resolution of the video may be downgraded to 640×480. A transformed video may refer to the outcome of transcoding, transrating, and/or transsizing a video (e.g., a source or original video). A transformed video may refer to a video that has been edited. Editing may introduce a time shift into the source or original version of the video. For example, a video (e.g., a source or original video) may be edited to add or remove a warning notice at the beginning of the video and the resultant edited video may be referred to as a transformed video. The transformed video may have an offset equal to the length of the warning as compared to the original version of the video.

A second synchronization signal may be determined for the transformed version of the video using the statistic at 340. For example, if a statistic utilized on the video is mean pixel intensity, it may be computed on the transformed version of the video. As above, the statistic may be mean pixel intensity while the second synchronization signal may be a number representing the computation of the mean pixel intensity on one or more frames in the transformed video. A request for tag information for one or more of the entities in the transformed version of the video may be received at 350. For example, a user receiving a streamed version of a video that is transformed from the source version may pause the video and click on an actor's face or select a portion of a video frame in the transformed video to query the identity of the actor or to obtain other information about the scene and/or actor. The first synchronization signal may be compared to the second synchronization signal to determine a transformed video reference point location for the requested tag information at 360. For example, the first and second synchronization signals may be plotted as a function of time or frame number. Alignment of the profiles may indicate where the appropriate location to obtain a response to the query in the source or tagged video. The requested tag information may be provided at the transformed video reference point location based on the comparison of the first synchronization signal to the second synchronization signal at 370. In some configurations, tag information may be filtered. The transformed video may contain multiple tagged entities that may be excluded from the results returned if the entities are not within the portion of the transformed video that was selected at 350 as part of the query or request for tag information.

In some configurations, more than one statistic may be computed and utilized as a first synchronization signal. That is, at step 320, a second statistic may be used to determine a synchronization signal. For example, the second statistic may be the mean color tone for each video frame and the first statistic may be the mean pixel intensity. Likewise, at step 340, the second statistic may be used to determine a synchronization signal. The use of a second statistic may involve, for example, repeating steps 310 to 360 as described above, but with a second statistic. For example, at 320, a third synchronization signal may be determined using the second statistic and, at 340, a fourth synchronization signal may be determined using the second statistic. The third and fourth synchronization signals may be compared at 360 and this comparison may be performed alongside the comparison of the first synchronization signal to the second synchronization signal. The results of both comparisons then may be separately compared to each other to determine the transformed video reference point location. In some configurations, it the second statistic may be incorporated into the first synchronization signal at 320 and the second synchronization signal at 340 respectively.

When synchronization is required between a video and the transformed video, a series of Equations 1-4 may be employed to synchronize the videos. In Equation 1, k represents an offset between a synchronization signal from an original version of the video (e.g., the tagged source video), x[n], and a synchronization signal from a transformed version of the video, y[n]. A frame number or time value is captured by the variable n. Equations 1-4 may be substituted for the corresponding coefficient in Equation 4. The auto-correlation coefficients, as defined by Equations 2 and 3, may be used to determine a maximum and minimum variation from the source video itself or the transformed video itself for a given statistic (e.g., mean pixel intensity). Equations 2 and 3 may serve to limit the range of values obtained from Equation 4 to ±1. Equation 4, thus, represents a normalized correlation value, $\rho_{xy}[k]$. To determine k, a range of values may be input for k (e.g., 0-100 ms offset, or 0-1500 video frames) with each value being computed within the range. A peak may be detected at the offset, k, for the normalized correlation value, $\rho_{xy}[k]$, that may define where the transformed and source video are most similar. A value of one indicates a highly similar or identical match between the synchronization signals (e.g., x[n] and y[n]) and, thus, the a highly similar or identical match between the source video and the transformed video. A value of negative one indicates that the source video and the transformed video are highly dissimilar or completely anti-correlated for the statistic. A value of $\rho_{xy}[k]$ that is close to zero indicates that the synchronization signals may be uncorrelated or unrelated to the selected offset (i.e., k) value.

Figure 4A:
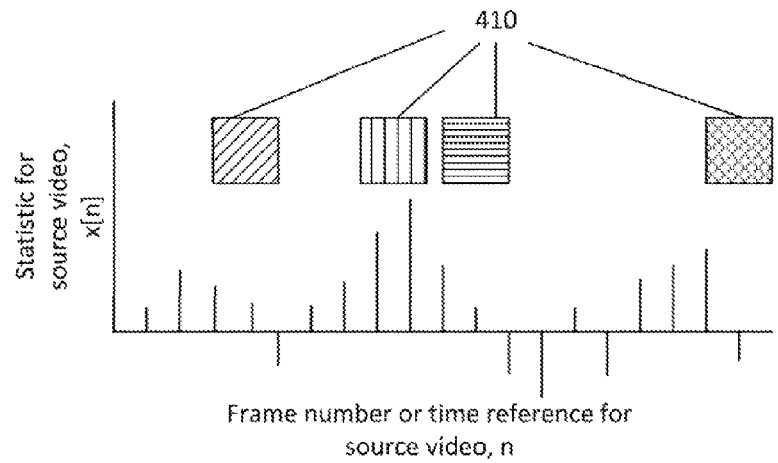
FIG. 4A is an example of a statistic determination for a source video.
Figure 4B:
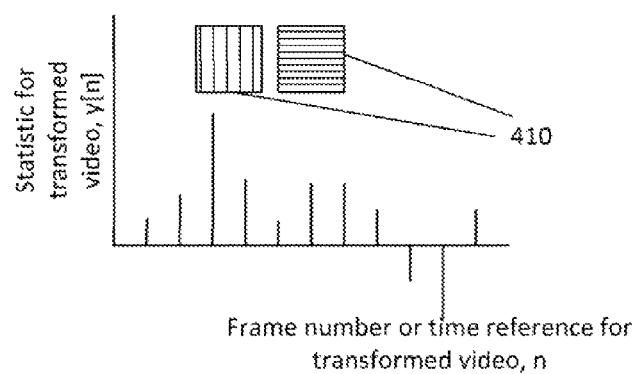
FIG. 4B is an example of a statistic calculation for a transformed video.
Figure 4C:
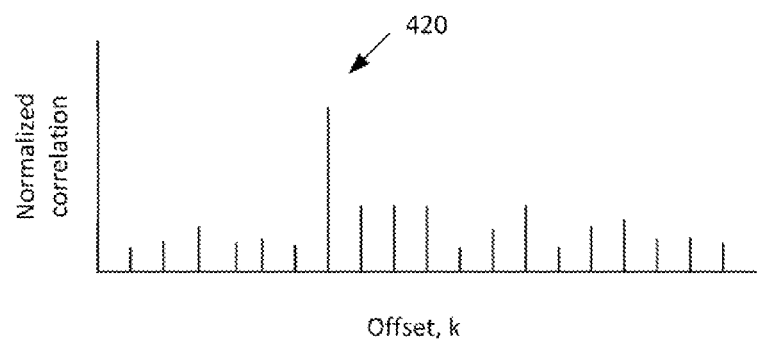
FIG. 4C is an example of a normalization correlation determination as disclosed herein.

FIG. 4A shows an example of a source video, x[n], on which a statistic such as mean pixel intensity has been calculated for several frames or time references, n. The stem plots correspond to a synchronization signal from a statistic as described earlier. FIG. 4B shows an example of a transformed video, y[n], and a second synchronization signal from the statistic that has been computed at variety of video frames or time references, n. Examples of various scenes in a movie are depicted in both FIGS. 4A and 4B 410. FIG. 4C shows an example of $\rho_{xy}[k]$ (i.e., "normalized correlation") being determined for a range of k values. A peak 420 is shown that indicates the appropriate offset for the transformed and source videos. Using the offset information, tag information may be retrieved from the tagged source video at the appropriate location in the video. For example, the offset determined in FIG. 4C as a peak 420 may be added to the time value represented by the point in the transformed video at which a request for tag information has been made. The offset value may indicate how far out of sync the transformed video is from a source video. Thus, the appropriate tag information from the source video may be retrieved.

$$r_{xy}[k] = \sum_{n=-\infty}^{\infty} x[n]y[n-k] \quad \text{Equation 1}$$

$$r_{xx}[k] = \sum_{n=-\infty}^{\infty} x[n]x[n-k] \quad \text{Equation 2}$$

$$r_{yy}[k] = \sum_{n=-\infty}^{\infty} y[n]y[n-k] \quad \text{Equation 3}$$

$$\rho_{xy}[k] = \frac{r_{xy}[k]}{\sqrt{r_{xx}[0]r_{yy}[0]}} \quad \text{Equation 4}$$

In an implementation, an example of which is shown in FIG. 5, a system is provided that includes a database 505 and a processor 508 communicatively coupled thereto. The database 505 may be used to store tag information for one or more entities in a video. In some configurations, the database may store the first synchronization signal and/or the second synchronization signal as disclosed herein. As described earlier, the tag information may include an identity of each of the entities and a video entity reference location, such as a time reference or frame reference for each of the entities. The processor 508 may be configured to determine tag information for the entities in the video at 510. It may determine a first synchronization signal for the video using a statistic as described above at 520. The processor 508 may provide a transformed version of the video at 530. It may be configured to determine a second synchronization signal for the transformed version of the video using the statistic 540. The processor 508 may receive a request for tag information for at least one of the entities in the transformed version of the video at 550 and compare the first synchronization signal to the second synchronization signal to determine a transformed video reference point location for the requested tag information at 560 as described above. The processor 508 may provide the requested tag information at the transformed video reference point location based on the comparison of the first synchronization signal to the second synchronization signal at 570.

Figure 6:
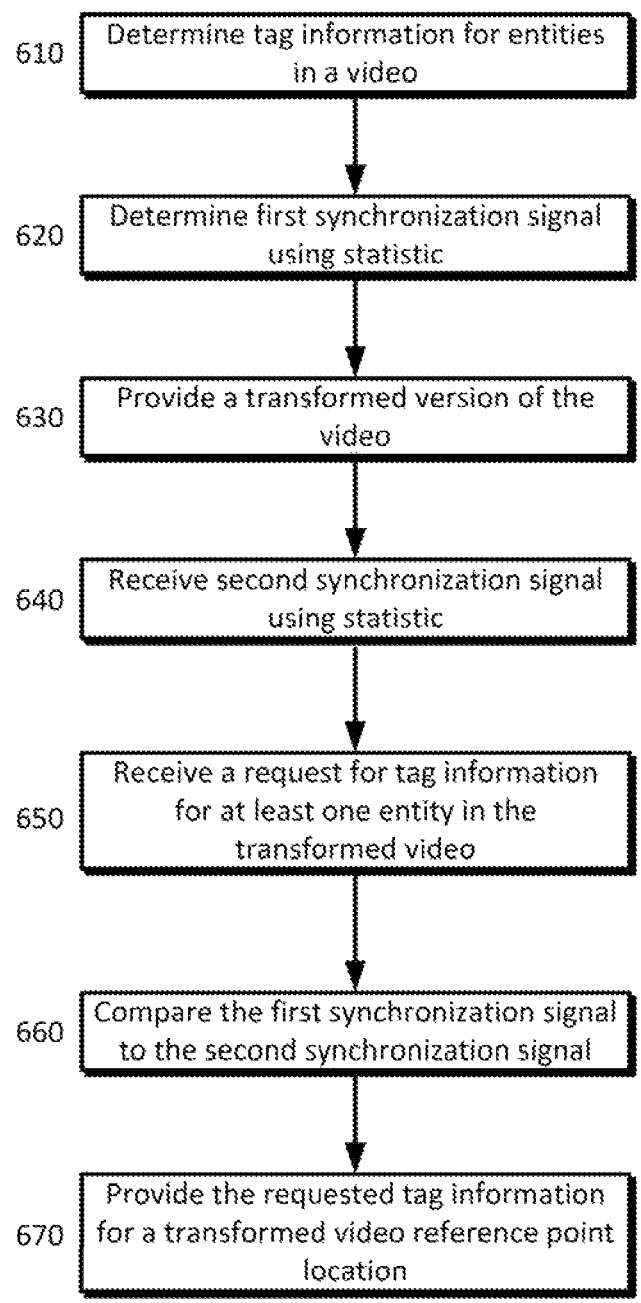
FIG. 6 is an example method for synchronizing a source video containing tag information with a transformed version of the video in which the first synchronization signal is determined at a location distinct from the second synchronization signal as disclosed herein.

In an implementation, tag information for one or more entities in a video may be determined at 610 as shown in the example provided in FIG. 6. A first synchronization signal for the video may be determined using a statistic at 620. The first synchronization signal may be determined, for example, at a location or with computer hardware that is distinct from the device which receives a transformed version of the video. A transformed version of the video may be provided, for example, to a user device such as a smartphone or tablet at 630. A second synchronization signal for the transformed version of the video may be received using the statistic at 640. For example, the computation of the second synchronization signal may be performed at a location and/or hardware that is coincident with the device which is being used to consume the transformed video. The device receiving the transformed version of the video may transmit the second synchronization signal to a remote database, for example. A request for tag information may be received for at least one entity in the transformed version of the video at 650. The first synchronization signal may be compared to the second synchronization signal to determine a transformed video reference point location for the requested tag information at 660 as described above. The requested tag information may be provided at the transformed video reference point location based on the comparison of the first synchronization signal to the second synchronization signal at 670.

Figure 7:
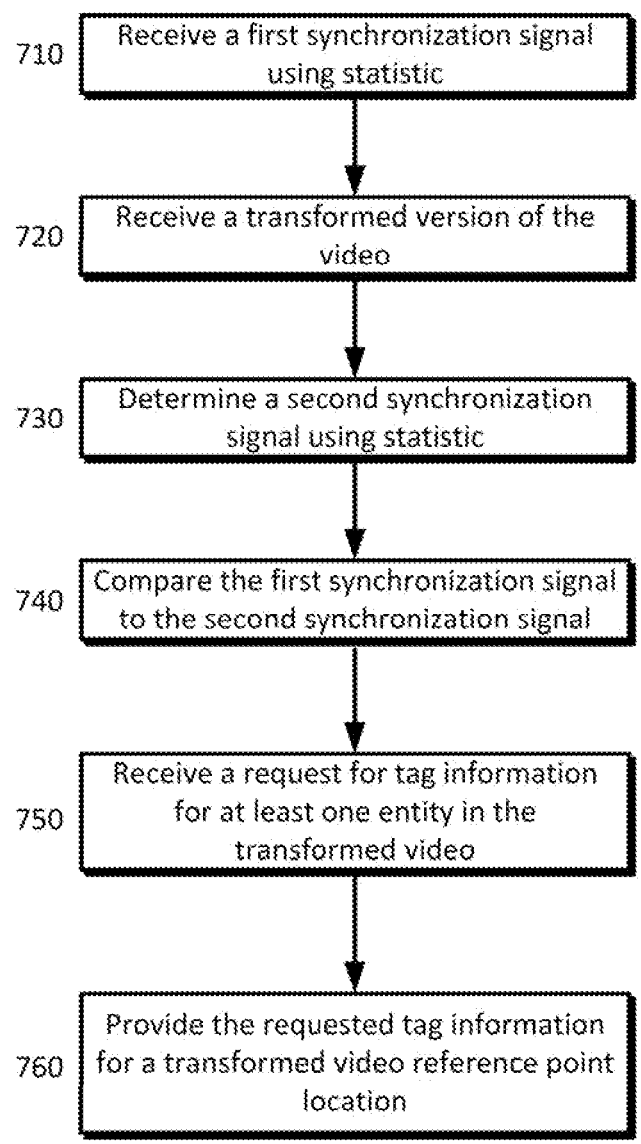
FIG. 7 is an example method for synchronizing a source video containing tag information with a transformed version of the video in which the comparison of the first synchronization signal to the second synchronization signal is performed on the device which received the transformed version of the video as disclosed herein.

According to an implementation, an example of which is provided in FIG. 7, a first synchronization signal may be received for a video that is based on a statistic at 710. For example, a smart phone may receive the first synchronization signal. In some configurations, a request for the first synchronization signal may be received by a remote server, for example, if the computation of the first synchronization signal and the second synchronization signal is to be performed on the device on which the transformed version of the video is received. A transformed version of the video may be received, for example, by a smartphone or tablet at 720 and the smartphone or tablet may request the first synchronization signal from a server such as a the server providing the transformed version of the video. A second synchronization signal for the transformed version of the video may be determined using the statistic at 730 as described earlier. For example, the smartphone may determine a second synchronization signal. The first synchronization signal may be compared to the second synchronization signal to determine a transformed video reference point location at 740. The comparison may be performed on the device which received the transformed version of the video, for example. Tag information for at least one entity in the transformed version of the video may be requested based on the transformed video reference point location at 750. The tag information may include an identity of each of the entities for the transformed video reference point location. Tag information for the entity for the transformed video reference point location may be received at 760.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method, comprising:
   determining tag information for a plurality of entities in a video, wherein the tag information comprises an identity of each of the plurality of entities and a video entity reference location for each of the plurality of entities;
   determining a first synchronization signal for the video using a first statistic and a second statistic, each of the first statistic and the second statistic selected independently from the group consisting of: a mean pixel intensity, a mean color intensity, a mean color tone, a number of pixels of a particular intensity, a number of pixels of a particular color, and a centroid of a highest pixel intensity for a frame;
   providing a transformed version of the video;
   determining a second synchronization signal for the transformed version of the video using the second statistic;
   receiving a request for tag information for at least one of the plurality of entities in the transformed version of the video;
   comparing the first synchronization signal to the second synchronization signal to determine a transformed video reference point location for the requested tag information; and
   providing the requested tag information at the transformed video reference point location based on the comparison of the first synchronization signal to the second synchronization signal.

2. The method of claim 1, wherein the tag information further comprises a position of an entity in a frame of the video.

3. The method of claim 1, wherein the video entity reference location comprises a frame of the video.

4. The method of claim 1, wherein an entity is selected from the group consisting of: an audio component and a video component.

5. The method of claim 4, wherein the audio component is selected from the group consisting of: a soundtrack, a voice, a speech, and a sound effect.

6. The method of claim 4, wherein the video component is selected from the group consisting of: a scene break, a geographic location, a face, a person, an object, a physical object, a text, and a landmark.

7. The method of claim 1, wherein the first statistic is computed for at least a portion of a video frame.

8. The method of claim 1, wherein the receiving the request for the tag information includes receiving a query related to a selected portion of a video frame in the transformed version of the video.

9. The method of claim 8, wherein the receiving the request for the tag information further includes:
   determining a corresponding selected portion of a video frame in the video; and
   excluding tag information for an entity that is not within the selected portion of the video frame in the transformed version of the video from being provided.

10. A system, comprising:
    a database for storing tag information for a plurality of entities in a video, wherein the tag information comprises an identity of each of the plurality of entities and a video entity reference location for each of the plurality of entities; and
    a processor communicatively coupled to the database and configured to:
    determine tag information for the plurality of entities in the video;
    determine a first synchronization signal for the video using a first statistic and a second statistic, each of the first statistic and the second statistic selected independently from the group consisting of: a mean pixel intensity, a mean color intensity, a mean color tone, a number of pixels of a particular intensity, a number of pixels of a particular color, and a centroid of a highest pixel intensity for a frame;
    provide a transformed version of the video;
    determine a second synchronization signal for the transformed version of the video using the second statistic;
    receive a request for tag information for at least one of the plurality of entities in the transformed version of the video;
    compare the first synchronization signal to the second synchronization signal to determine a transformed video reference point location for the requested tag information; and
    provide the requested tag information at the transformed video reference point location based on the comparison of the first synchronization signal to the second synchronization signal.

11. The system of claim 10, wherein the tag information further comprises a position of an entity in a frame of the video.

12. The system of claim 10, wherein the video entity reference location comprises a frame of the video.

13. The system of claim 10, wherein an entity is selected from the group consisting of: an audio component and a video component.

14. The system of claim 13, wherein the audio component is selected from the group consisting of: a soundtrack, a voice, a speech, and a sound effect.

15. The system of claim 13, wherein the video component is selected from the group consisting of: a scene break, a geographic location, a face, a person, an object, a physical object, a text, and a landmark.

16. The system of claim 10, wherein the first statistic is computed for at least a portion of a video frame.

17. The system of claim 10, wherein the processor is configured to receive the request for the tag information by receiving a query related to a selected portion of a video frame in the transformed version of the video.

18. The system of claim 17, wherein the processor is further configured to receive the request for the tag information by:
   determining a corresponding selected portion of a video frame in the video; and
   excluding tag information for an entity that is not within the selected portion of the video frame in the transformed version of the video from being provided.

19. A method, comprising:
   determining tag information for a plurality of entities in a video, wherein the tag information comprises an identity of each of the plurality of entities and a video entity reference location for each of the plurality of entities;
   determining a first synchronization signal for the video using a first statistic and a second statistic, each of the first statistic and the second statistic selected independently from the group consisting of: a mean pixel intensity, a mean color intensity, a mean color tone, a number of pixels of a particular intensity, a number of pixels of a particular color, and a centroid of a highest pixel intensity for a frame;
   providing a transformed version of the video;
   receiving a second synchronization signal for the transformed version of the video using the second statistic;
   receiving a request for tag information for at least one of the plurality of entities in the transformed version of the video;
   comparing the first synchronization signal to the second synchronization signal to determine a transformed video reference point location for the requested tag information; and
   providing the requested tag information at the transformed video reference point location based on the comparison of the first synchronization signal to the second synchronization signal.

20. A system, comprising:
   a database for storing tag information for a plurality of entities in a video, wherein the tag information comprises an identity of each of the plurality of entities and a video entity reference location for each of the plurality of entities; and
   a processor communicatively coupled to the database and configured to:
      determine tag information for the plurality of entities in the video;
      determine a first synchronization signal for the video using a first statistic and a second statistic, each of the first statistic and the second statistic selected independently from the group consisting of: a mean pixel intensity, a mean color intensity, a mean color tone, a number of pixels of a particular intensity, a number of pixels of a particular color, and a centroid of a highest pixel intensity for a frame;
      provide a transformed version of the video;
      receive a second synchronization signal for the transformed version of the video using the second statistic;
      receive a request for tag information for at least one of the plurality of entities in the transformed version of the video;
      compare the first synchronization signal to the second synchronization signal to determine a transformed video reference point location for the requested tag information; and
      provide the requested tag information at the transformed video reference point location based on the comparison of the first synchronization signal to the second synchronization signal.

21. A method, comprising:
   receiving a first synchronization signal for a video that is based on a first statistic and a second statistic, each of the first statistic and the second statistic selected independently from the group consisting of: a mean pixel intensity, a mean color intensity, a mean color tone, a number of pixels of a particular intensity, a number of pixels of a particular color, and a centroid of a highest pixel intensity for a frame;
   receiving a transformed version of the video;
   determining a second synchronization signal for the transformed version of the video using the second statistic;
   comparing the first synchronization signal to the second synchronization signal to determine a transformed video reference point location;
   requesting tag information for at least one of a plurality of entities in the transformed version of the video based on the transformed video reference point location, wherein the tag information for the plurality of entities comprises an identity of each of the plurality of entities for the transformed video reference point location; and
   receiving the tag information for the at least one of the plurality of entities for the transformed video reference point location.

22. The method of claim 21, further comprising requesting the first synchronization signal.

23. A system, comprising:
   a database for storing synchronization signal data; and
   a processor communicatively coupled to the database and configured to:
      receive a first synchronization signal for a video that is based on a first statistic and a second statistic, each of the first statistic and the second statistic selected independently from the group consisting of: a mean pixel intensity, a mean color intensity, a mean color tone, a number of pixels of a particular intensity, a number of pixels of a particular color, and a centroid of a highest pixel intensity for a frame;
      receive a transformed version of the video;
      determine a second synchronization signal for the transformed version of the video using the second statistic;

compare the first synchronization signal to the second synchronization signal to determine a transformed video reference point location;

request tag information for at least one of a plurality of entities in the transformed version of the video based on the transformed video reference point location, wherein the tag information for the plurality of entities comprises an identity of each of the plurality of entities for the transformed video reference point location; and receive the tag information for the at least one of the plurality of entities for the transformed video reference point location.

24. The system of claim 23, wherein the processor is further configured to request the first synchronization signal.

25. A method, comprising:

determining tag information for a plurality of entities in a video, wherein the tag information comprises an identity of each of the plurality of entities and a video entity reference location for each of the plurality of entities;

determining a first synchronization signal for the video using a statistic, the statistic selected independently from the group consisting of: a mean pixel intensity, a mean color intensity, a mean color tone, a number of pixels of a particular intensity, a number of pixels of a particular color, and a centroid of a highest pixel intensity for a frame;

providing a transformed version of the video;

determining a second synchronization signal for the transformed version of the video using the statistic;

receiving a request for tag information for at least one of the plurality of entities in the transformed version of the video, the request including a query related to a selected portion of a video frame in the transformed version of the video;

determining a corresponding selected portion of a video frame in the video;

comparing the first synchronization signal to the second synchronization signal to determine a transformed video reference point location for the requested tag information; and providing the requested tag information at the transformed video reference point location based on the comparison of the first synchronization signal to the second synchronization signal, but excluding tag information for an entity that is not within the selected portion of the video frame in the transformed version of the video from being provided.

26. A system, comprising:

a database for storing tag information for a plurality of entities in a video, wherein the tag information comprises an identity of each of the plurality of entities and a video entity reference location for each of the plurality of entities; and a processor communicatively coupled to the database and configured to:

determine tag information for the plurality of entities in the video;

determine a first synchronization signal for the video using a statistic, the statistic selected independently from the group consisting of: a mean pixel intensity, a mean color intensity, a mean color tone, a number of pixels of a particular intensity, a number of pixels of a particular color, and a centroid of a highest pixel intensity for a frame;

provide a transformed version of the video;

determine a second synchronization signal for the transformed version of the video using the statistic;

receive a request for tag information for at least one of the plurality of entities in the transformed version of the video, the request including a query related to a selected portion of a video frame in the transformed version of the video;

determine a corresponding selected portion of a video frame in the video;

compare the first synchronization signal to the second synchronization signal to determine a transformed video reference point location for the requested tag information; and provide the requested tag information at the transformed video reference point location based on the comparison of the first synchronization signal to the second synchronization signal, but exclude tag information for an entity that is not within the selected portion of the video frame in the transformed version of the video from being provided.

27. A method, comprising:

determining tag information for a plurality of entities in a video, wherein the tag information comprises an identity of each of the plurality of entities and a video entity reference location for each of the plurality of entities;

determining a first synchronization signal for the video using a statistic, the statistic selected independently from the group consisting of: a mean pixel intensity, a mean color intensity, a mean color tone, a number of pixels of a particular intensity, a number of pixels of a particular color, and a centroid of a highest pixel intensity for a frame;

providing a transformed version of the video;

receiving a second synchronization signal for the transformed version of the video using the statistic;

receiving a request for tag information for at least one of the plurality of entities in the transformed version of the video, the request including a query related to a selected portion of a video frame in the transformed version of the video;

determining a corresponding selected portion of a video frame in the video;

comparing the first synchronization signal to the second synchronization signal to determine a transformed video reference point location for the requested tag information; and providing the requested tag information at the transformed video reference point location based on the comparison of the first synchronization signal to the second synchronization signal, but excluding tag information for an entity that is not within the selected portion of the video frame in the transformed version of the video from being provided.

28. A system, comprising:

a database for storing tag information for a plurality of entities in a video, wherein the tag information comprises an identity of each of the plurality of entities and a video entity reference location for each of the plurality of entities; and a processor communicatively coupled to the database and configured to:

determine tag information for the plurality of entities in the video;

determine a first synchronization signal for the video using a statistic, the statistic selected independently from the group consisting of: a mean pixel intensity, a mean color intensity, a mean color tone, a number of pixels of a particular intensity, a number of pixels of a particular color, and a centroid of a highest pixel intensity for a frame;

provide a transformed version of the video;

receive a second synchronization signal for the transformed version of the video using the statistic;

receive a request for tag information for at least one of the plurality of entities in the transformed version of the video, the request including a query related to a selected portion of a video frame in the transformed version of the video;

determine a corresponding selected portion of a video frame in the video;

compare the first synchronization signal to the second synchronization signal to determine a transformed video reference point location for the requested tag information; and provide the requested tag information at the transformed video reference point location based on the comparison of the first synchronization signal to the second synchronization signal, but exclude tag information for an entity that is not within the selected portion of the video frame in the transformed version of the video from being provided.

* * * * *